Patented Apr. 20, 1926.

1,581,918

UNITED STATES PATENT OFFICE.

WILLIAM HASTINGS CAMPBELL, OF MONASTEREVAN, IRELAND.

PRODUCTION OF FERMENTABLE WORTS.

Application filed July 18, 1925. Serial No. 44,611.

*To all whom it may concern:*

Be it known that I, WILLIAM HASTINGS CAMPBELL, a British subject, and residing at Monasterevan, county Kildare, Ireland, have invented certain new and useful Improvements in and Relating to the Production of Fermentable Worts, of which the following is a specification.

This invention relates to the production of fermentable worts, the production of industrial alcohol and the cultivation of yeast, and has for its object to provide improvements therein.

The invention consists broadly in the process of producing fermentable worts and the cultivation of yeast which comprises introducing the liquor component of the wort and the solid material from which the fermentable bodies are derived into apparatus in which a plurality of superimposed inclinable diaphragms are arranged, allowing the solid material to settle on the diaphragms, withdrawing the wort and discharging the solid material from the apparatus after a suitable washing operation to extract the soluble bodies mechanically held thereby.

One construction of apparatus suitable for use in accordance with the invention is illustrated by way of example in the accompanying drawings, in which:—

Figure 3 is an elevation in section on a plane at right angles to the plane of section in Figure 2.

Figure 1:
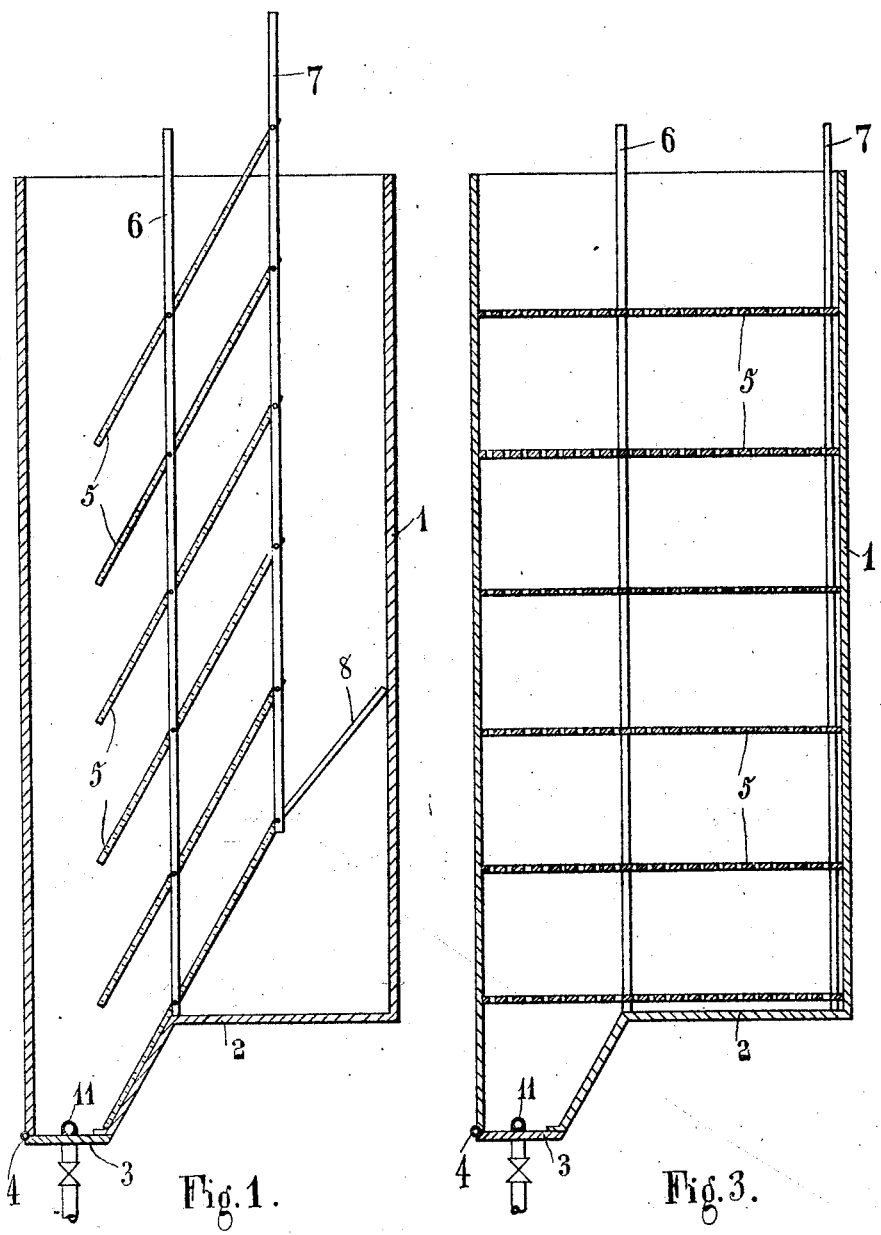
Figure 1 is a view in elevation of the device with one end wall removed.
Figure 2:
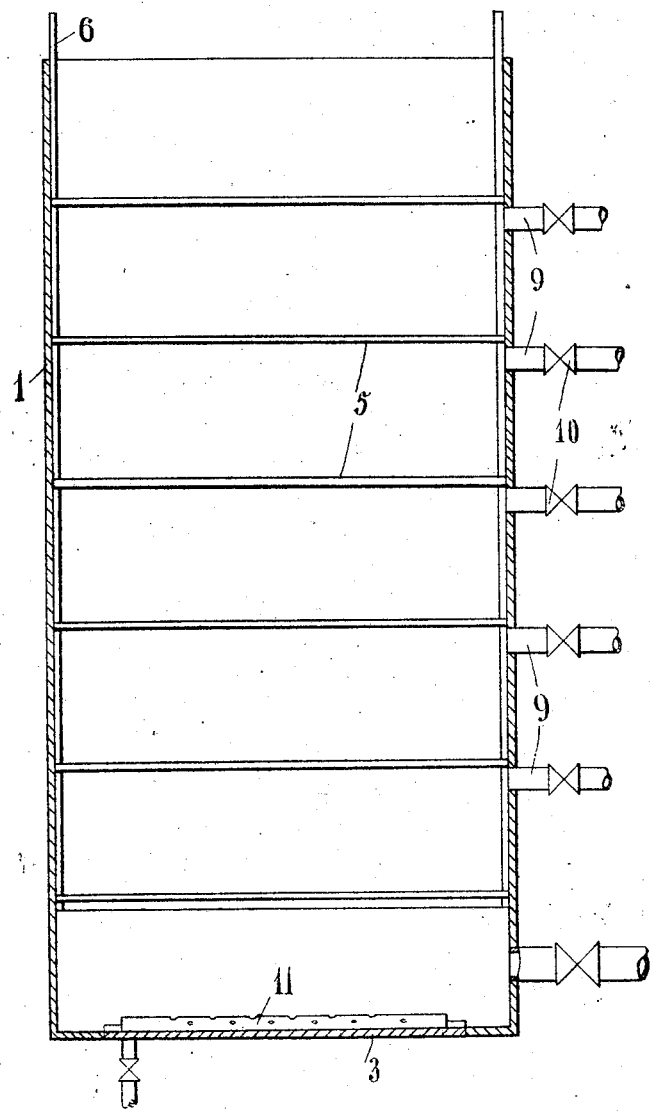
Figure 2 is a sectional elevation of the device viewed from the front.

Both Figures 2 and 3 show the device with the diaphragms in a horizontal position, Figure 1 showing the diaphragms in the inclined position.

In the construction illustrated in the drawings, 1 is the body of the vessel, 2 the base thereof which is provided with a portion adapted to form a hopper or means for discharging the solid contents from the device by way of the door 3 hinged at 4 to one wall of the vessel. The diaphragms 5 in the construction shown are perforated trays pivotally connected to the rod 6; one end of each of the trays is also pivoted to the rod 7 by appropriate motion of which the trays may be inclined, as shown in Figure 1, or may be arranged horizontally, as shown in Figures 2 and 3. The bottom tray is provided with a hinged flap adapted when the trays are inclined to prevent solid matter entering the space within the tank behind and below the lowermost diaphragm and to cause any solid matter which may fall from the upper trays to descend into the hopper portion of the device from which it may be discharged.

A plurality of pipes 9 are, in the construction illustrated, connected to one wall of the container, each of these pipes being provided with a valve 10 to enable liquid to be withdrawn as desired from different levels. The position of the pipes relatively to the diaphragms may be varied to suit particular requirements.

In the construction illustrated certain of them open into the vessel immediately below the diaphragms provided therein. The lowermost one, however, is arranged in the portion of the vessel forming the hopper and acts as a final drain cock.

All of these pipes and valves, except the lowermost one, may be omitted when the device is intended for use in certain industries as, for example, in brewery or distillery work.

In the hopper portion of the vessel also a perforated pipe 11 is arranged so that if desired compressed air or steam may be forced into the tank in order to agitate the contents thereof.

The number of perforations in the diaphragms or plates is preferably very large and the total area of the holes therein may be about five times as great as the area of the holes per square foot of the false bottom of an average brewery or distillery mash tun, while the diameter of each hole will be considerably smaller than the holes in such a false bottom.

In preparing the worts in accordance with the invention the grist together with the liquor is introduced if necessary after a preliminary mashing into apparatus of the character above specified while the diaphragms thereof are in the inclined position.

After the introduction of the mixture of liquor and grist the diaphragms are caused to assume the horizontal position.

The mixture is then allowed to remain quiescent for a sufficient time to permit a bed of solid matter to settle upon the diaphragms which for the purpose in question will be perforated.

The liquor is circulated and, if necessary, heated until the desired changes have progressed sufficiently far, that is to say in preparing worts intended for fermentation for distillery purposes until the starch has been converted into maltose and the maltose extracted, or in the preparation of worts intended for use in the production of beer until the starch has been converted into maltose and dextrine and dissolved out.

On to the liquid contents of the apparatus a layer of hot water is floated and the wort withdrawn from the base of the apparatus, a sufficient quantity of hot water being simultaneously introduced at the top to secure, in view of the rate at which the liquid is withdrawn, an economical extraction of the soluble material held mechanically by the solid residues or grains.

As will be understood, the weaker liquor withdrawn from the device toward the end of the operation may be used in the preparation of further worts.

The grains are removed from the apparatus by again inclining the diaphragm to cause the material settled thereon to be dumped to the base of the apparatus from which they may be removed by way of the door provided therein.

In treating previously prepared wort the wort and grains are introduced into the device from the mash tun while the diaphragms are in the inclined position, the mixture being agitated if desired. The diaphragms are then caused to assume their horizontal position, the material allowed to remain quiescent for a suitable time and the wort withdrawn and the grains washed and discharged in the manner above indicated.

The wort separated from the grains or other solids is then subjected in known manner to treatment adapted to yield a fermented liquid which may be the main product or to secure the development of yeast as a main product, the fermented material being in such case a by-product.

Having now described my invention what I claim as new and desire to secure by Letters Patent is:—

1. The process of producing fermentable liquid worts by extracting fermentable bodies from solid materials containing the same by a solvent liquid adapted to constitute the solvent liquid component of the wort, and in which said bodies are soluble, which comprises forming a suspension of the solid material in said solvent liquid, allowing the solid material in said suspension to settle in a plurality of layers, and withdrawing the liquid portion of the same.

2. The process defined in claim 1, withdrawing the solid material from said layers.

3. The process of producing fermentable liquid worts by extracting fermentable bodies from solid materials containing the same by a solvent liquid adapted to constitute the solvent liquid component of the wort, and in which said bodies are soluble, which comprises forming a suspension of the solid material in said solvent liquid, allowing the solid material in said suspension to settle in a plurality of layers, withdrawing a part of the liquid portion of the same, circulating a portion of said withdrawn liquid through said plurality of layers to cause extraction of the same, withdrawing the residual portion from said layers after the extraction has occurred, and then withdrawing the solid material from said layers.

In testimony whereof I have signed my name to this specification.

WILLIAM HASTINGS CAMPBELL.